United States Patent [19]

Roman et al.

[11] 4,078,140

[45] Mar. 7, 1978

[54] 2,3-DI-(2,3-DIIODOPROPOXY)-PROPYL CELLULOSE AND METHOD OF PRODUCING THE SAME

[75] Inventors: Alain Roman, Bossey; Jean-Pierre Sachetto, St. Julien-en-Genevois, both of France; Manfred Wust, Dardagny; Sergio Cuccolo, Geneva, both of Switzerland

[73] Assignee: Neste Oy, Finland

[21] Appl. No.: 809,451

[22] Filed: Jun. 23, 1977

[51] Int. Cl.$^2$ .................... C08B 11/00; G03C 1/52
[52] U.S. Cl. ........................... 536/84; 8/120; 96/90 R; 536/85; 536/90; 536/93
[58] Field of Search ............... 536/84, 85, 90, 93; 8/120

[56] References Cited

U.S. PATENT DOCUMENTS

| 2,974,134 | 3/1961 | Pollitzer | 536/99 |
| 3,063,982 | 11/1962 | Peras | 536/84 |
| 3,565,628 | 2/1971 | Garland et al. | 96/90 R |

*Primary Examiner*—Ronald W. Griffin
*Attorney, Agent, or Firm*—Steinberg & Blake

[57] ABSTRACT

The invention relates to a new substance, namely 2,3-di-(2,3-diiodopropoxy)-propyl cellulose and to the production of the same by the action of a dihalogenopropyl ether of cellulose with an alkali metal allylate with iodine addition to the resulting 2,3-di-allyloxy propyl cellulose.

9 Claims, No Drawings

2,3-DI-(2,3-DIIODOPROPOXY)-PROPYL CELLULOSE AND METHOD OF PRODUCING THE SAME

BACKGROUND OF THE INVENTION

New materials for use as photosensitive material for recording of an image or the like are constantly being sought. This invention relates to a new substance and to a method of producing the same, which substance has particularly good photosensitive properties.

CROSS-REFERENCE TO RELATED APPLICATION

Our U.S. patent application Ser. No. 809,452, filed June 23, 1977, and entitled "Photosensitive Material and Uses Thereof" relates to the uses of the new substance of the present invention as a photosensitive material and to materials providing such uses.

SUMMARY OF THE INVENTION

Generally speaking, in accordance with the present invention, provision is made for a new substance, namely 2,3-di-(2,3-diiodopropoxy)-propyl cellulose and to the production thereof.

It is a primary object of the present invention to provide for the substance 2,3-di-(2,3-diiodopropoxy)-propyl cellulose.

It is another object of the present invention to provide a method of producing this substance.

It is still a further object of the present invention to provide for various forms of 2,3-di-(2,3-diiodopropoyx)-propyl cellulose and for the production thereof.

Other objects and advantages of the present invention will be apparent from a further reading of the specification and of the appended claims.

With the above and other objects in view, the present invention mainly comprises as a new substance 2,3-di-(2,3-diiodopropoxy)-propyl cellulose. This substance consists of macromolecular chains having a structure similar to that of cellulose, formed by the combination of a large number of recurrent units derived from the cellobiose group of cellulose, these units being represented by the formula:

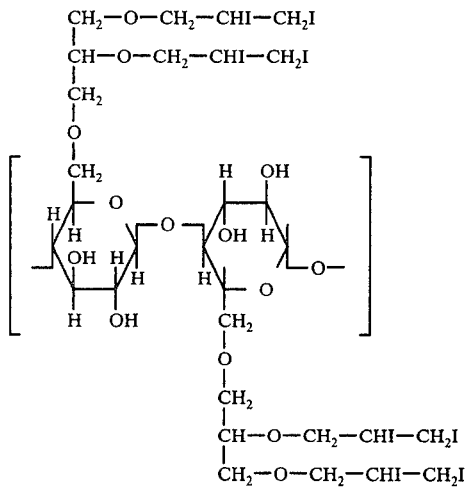

The 2,3-di-(2,3-diiodopropoxy)-propyl cellulose is produced by reacting a dihalogenopropyl ether of cellulose with an alkali metal allylate dissolved in allylic alcohol to form 2,3-di-allyloxy propyl cellulose and then effecting iodine addition on the allyl groups thereof.

The preferred dihalogenopropyl ether of cellulose is 2,3-dibromo-propyl cellulose. However, it is equally possible to use 2,3-dichloro-propyl cellulose or 2,3-diiodo-propyl cellulose.

The dihalogenopropyl ethers of cellulose are known compounds which are available in the same physical forms as cellulose itself, e.g. in the form of fibers, particles, powder, or even in the form of a film obtained by regeneration from an appropriate solvent.

The preparation of the dihalogenopropyl ethers of cellulose can be accomplished by the addition of bromine to allyl cellulose with each allyl group thereof fixing one molecule of bromine.

It is preferred according to the present invention to carry out the process using the dihalogenopropyl ether of cellulose in the form of fibers. However, it should be understood that it is equally possible to use this ether in any other physical form such as a powder or a film.

For reasons of economy and ready availability, it is preferred to use sodium allylate or potassium allylate as the alkali metal allylate.

The reaction of the dihalogenopropyl ether of cellulose with the alkali metal allylate is preferably effected by maintaining a suspension of the ether in the allylate solution in allylic alcohol for several hours under agitation. The preferred temperature is on the order of 60° C, with the time of the maintenance of the suspension being about 4 to 8 hours.

The iodine addition reaction to the allyl groups of the 2,3-di-allyloxy-propyl cellulose is preferably effected by suspending the latter substance in a solution of iodine in an appropriate solvent, e.g. a solution in methyl alcohol or ethyl alcohol, and then subjecting the thus obtained suspension to agitation while heating under reflux for several hours, preferably for 1 to 8 hours.

The thus-obtained final product, namely 2,3-di(2,3-diiodopropoxy)-propyl cellulose has the same appearance and physical form as the original dihalogenopropyl ether used as the starting material. Thus, for example, if the original starting material used is in the form of fibers or a white powder or a transparent or translucent film, the resulting final product will be in the same form.

The appearance of the final product can remain unchanged for an indefinite period of time provided that care is taken to keep the product in darkness and at a temperature whch does not exceed 130° C.

The resulting product having the structure indicated above is insoluble in water and usual organic solvents. However, it can be dissolved in the same manner as cellulose, using a complex solvent such as a mixture of nitric oxide ($N_2O_4$) and dimethylsulfoxide or dimethylformamide or a mixture of dimethylsulfoxide with paraformaldehyde. Also, as in the case of cellulose, this product can be regenerated from these solutions, for example by forming a translucent or transparent film in manner known per se with cellulose, for example by using a liquid precipitant such as methanol or another hydroxylic solvent or alternatively by the process known as "solvent casting".

The product of the present invention is photosensitive. Under the action of exposure to an activating radiation, such as daylight or ultraviolet radiation, the product undergoes irreversible modification resulting from the liberation of iodine in the form of various molecular and ionic radical species.

The iodine is principally in the form of free radicals such as the iodine radical itself, molecules such as the iodine molecule, and ions such as iodide ions ($I^-$) and periodate ions ($IO_4^-$).

Following the liberation of these "photolytic species", under the effect of exposure to an appropriate activating radiation, the product takes on a yellow to brown coloration, the intensity of which depends upon the nature and intensity of the radiation and upon the duration of the exposure.

Photosensitive fibers of the product of the present invention can be used for the manufacture of various photosensitive materials, for example, in sheet form, wherein at least the surface portion thereof contains the 2,3-di-(2,3-diiodopropoxy)-propyl cellulose of this invention. Such materials and uses thereof are described in greater detail in our copending application Ser. No. 809,452, filed June 23, 1977.

DESCRIPTION OF PREFERRED EMBODIMENTS

The invention is further illustrated by the the following example. The scope of the invention is not, however, meant to be limited to the specific details of the example.

EXAMPLE 40g of allyl cellulose fibers are suspended in 1 liter of pure ethanol having dissolved therein 20g of bromine. The thus obtained suspension is agitated for 24 hours at ambient temperature. The suspension is then filtered and the fibers are washed with methanol until excess bromine has been completely removed, after which the fibers are dried. There is thus obtained 47.5 g of 2,3-dibromopropyl cellulose having a bromine content of 20.08% by weight. The product has the form of fibers which are very white and have a mean length identical to that of the starting fibers.

40g of the dibromopropyl cellulose fibers thus obtained are suspended in 600ml of a solution of sodium allylate in allylic alcohol previously prepared by reacting 22g of metallic sodium with allylic alcohol. The suspension is agitated for 7 hours at a temperature between 55° and 60° C.

After cooling, the suspension is filtered and the obtained 2,3-di-allyloxy-propyl cellulose fibers are then washed with methanol in order to remove the sodium bromide which is formed during the reaction. There is thus obtained 31g of unsaturated fibers, light brown in color, having a residual bromine content of 26% by weight.

30g of the 2,3-di-allyloxy-propyl cellulose fibers thus obtained are suspended in 500ml of methanol in which 10g of iodine has previously been dissolved. The suspension is agitated for 8 hours while heating under reflux. The suspension is then filtered and the fibers are washed with methanol in the absence of light.

There is thus obtained 26.7g of white photosensitive fibers of 2,3-di-(2,3-diiodopropoxy)-propyl cellulose having a chemically fixed iodine content of 10.14% by weight.

The same substance in particulate form or in film form can be obtained in the same manner except that the original substance would be used in particulate or film form, respectively.

It is apparent that variations and modifications can be made without departing from the spirit of the invention.

What is claimed is:

1. 2,3-di-(2,3-diiodopropoxy)-propyl cellulose.

2. Method of producing the 2,3-di-(2,3-diiodopropoxy)-propyl cellulose of claim 1, which comprises reacting a dihalogenopropyl ether of cellulose with an alkali metal allylate to form 2,3-di-allyloxy-propyl cellulose, and subjecting said 2,3-di-allyloxy-propyl cellulose to iodine addition reaction on the allyl groups thereof.

3. Method according to claim 2 wherein said alkali metal allylate which is reacted with said dihalogenopropyl ether of cellulose is in an allyl alcohol solution.

4. Method according to claim 2 wherein said dihalogenopropyl ether of cellulose is selected from the group consisting of 2,3-dibromopropyl cellulose, 2,3-dichloropropyl cellulose and 2,3-diiodopropyl cellulose.

5. Method according to claim 2 wherein said dihalogenopropyl ether of cellulose is in fiber form.

6. Method according to claim 2 wherein said alkali metal allylate is selected from the group consisting of sodium allylate and potassium allylate.

7. Method according to claim 3 wherein the reaction of said dihalogenopropyl ether of cellulose with said alkali metal allylate is effected under agitation at a temperature of about 60°0 C for about 4–8 hours.

8. Method according to claim 2 wherein the iodine addition is effected by subjecting a suspension of the 2,3-di-allyloxy-propyl cellulose in a solution of iodine to agitation while heating under reflux.

9. Method according to claim 8 wherein said iodine solution is a solution thereof in methyl alcohol.

* * * * *